(12) United States Patent
Ahmed et al.

(10) Patent No.: US 9,948,666 B2
(45) Date of Patent: *Apr. 17, 2018

(54) FORECASTING AND CLASSIFYING CYBER-ATTACKS USING ANALYTICAL DATA BASED NEURAL EMBEDDINGS

(71) Applicant: International Business Machines Corporation, Armonk, NY (US)

(72) Inventors: Mohamed N. Ahmed, Leesburg, VA (US); Aaron K. Baughman, Silver Spring, MD (US); John F. Behnken, Hurley, NY (US); Mauro Marzorati, Lutz, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/019,270

(22) Filed: Feb. 9, 2016

(65) Prior Publication Data
US 2017/0230400 A1 Aug. 10, 2017

(51) Int. Cl.
*H04L 29/06* (2006.01)
*G06N 7/00* (2006.01)
*G06N 3/08* (2006.01)

(52) U.S. Cl.
CPC ......... *H04L 63/1433* (2013.01); *G06N 3/08* (2013.01); *G06N 7/005* (2013.01)

(58) Field of Classification Search
CPC .................................................. H04L 63/1433
(Continued)

(56) References Cited

U.S. PATENT DOCUMENTS

| 6,785,592 B1 | 8/2004 | Smith et al. |
| 8,274,377 B2 | 9/2012 | Smith et al. |

(Continued)

FOREIGN PATENT DOCUMENTS

| CA | 2337798 A1 | 1/2000 |
| CN | 102638445 B | 3/2015 |

(Continued)

OTHER PUBLICATIONS

PWC, Embedding cyber security into the energy ecosystem, An integrated approach to assessing cyber threats and protecting your assets, Feb. 2013.

(Continued)

*Primary Examiner* — Jacob Lipman
(74) *Attorney, Agent, or Firm* — Garg Law Firm, PLLC; Rakesh Garg; Christopher K. McLan

(57) ABSTRACT

A first collection including an analytical feature vector and a Q&A feature vector is constructed. A second collection is constructed from the first collection by inserting noise in at least one of the vectors. A third collection is constructed by crossing over at least one of vectors of the second collection with a corresponding vector of a fourth collection, migrating at least one of the vectors of the second collection with a corresponding vector of a fifth collection. Using a forecasting configuration, an analytical feature vector of the third collection is aged to generate a changed analytical feature vector containing analytical feature values expected at a future time. The changed analytical feature vector is input into a trained neural network to predict a probability of the cyber-attack occurring at the future time.

20 Claims, 15 Drawing Sheets

(58) Field of Classification Search
USPC .......................................................... 726/25
See application file for complete search history.

(56) References Cited

U.S. PATENT DOCUMENTS

| | | |
|---|---|---|
| 9,088,606 B2 | 7/2015 | Ranum et al. |
| 2008/0258880 A1 | 10/2008 | Smith |
| 2011/0264608 A1 | 10/2011 | Gonsalves et al. |
| 2015/0036922 A1 | 2/2015 | El Dokor |
| 2015/0163242 A1 | 6/2015 | Laidlaw et al. |
| 2015/0339570 A1 | 11/2015 | Scheffler |
| 2015/0381649 A1 | 12/2015 | Schultz et al. |

FOREIGN PATENT DOCUMENTS

| | | |
|---|---|---|
| EP | 1093617 A4 | 1/2002 |
| WO | 2000002138 A1 | 1/2000 |

OTHER PUBLICATIONS

Yang et al; Characterizing Cyber Attacks through Variable Length Markov Models, CMMC 2007.
Palmeri et al, Network anomaly detection through non linear analysis, computers & security 29 (2010) 737 e 755.
Anonymous, Analytic Forecasting of Future Electronic Cyber Threats with Deep Learning and Coevolutionary Strategies, Oct. 28, 2015.
Appendix P, Feb. 8, 2016.
Appendix P, 2017.

*FIGURE 5*

| SPECIES 502 | | OBJECTIVE-FUNCTION 504 |
|---|---|---|
| RECALL ONLY | $\text{recall} = \dfrac{(TP)}{(TP + FN)}$ | max(recall) |
| BIASED RECALL | $B_r = \dfrac{a(\text{recall}) + (1-a)(\text{precision})}{2}$ ; a = 0.75 | max($B_r$) |
| ACCURACY | $\text{acc} = \dfrac{(TP + TN)}{(TP + FN + FN + TN)}$ | max(acc) |
| BIASED PRECISION | $B_p = \dfrac{a(\text{precision}) + (1-a)(\text{recall})}{2}$ ; a = 0.75 | max($B_p$) |
| PRECISION ONLY | $\text{FDR} = 1 - \text{precision} = \dfrac{(FP)}{(TP + FP)}$ | max(precision) |

506

FORECASTING AND CLASSIFYING CYBER-ATTACKS USING ANALYTICAL DATA BASED NEURAL EMBEDDINGS

TECHNICAL FIELD

The present invention relates generally to a method, system, and computer program product for predicting cyber-attacks on data processing environments. More particularly, the present invention relates to a method, system, and computer program product for forecasting and classifying cyber-attacks using analytical data based neural embeddings.

BACKGROUND

Cyber-attack on a data processing environment is an unauthorized actual or potential exploitation, access, or use of a system or data contained in the data processing environment. A cyber-attack is also known as, or referred to as, a cyber threat, data breach, data security breach, system intrusion, malicious activity, and other similarly purposed terms. Generally, within this disclosure, any activity intended to cause harm to a system or data, or to cause harm using a system or data from a data processing environment is contemplated within the scope of "cyber-attack". "cyber-attack" is also interchangeably referred to herein as simple "attack" unless expressly distinguished where used.

Malicious computer-based intrusions against computing infrastructure in the United States are increasing by a significant order of magnitude. The value of the US intellectual property stolen or destroyed through cyber attacks potentially now exceeds one trillion dollars.

The steadily increasing cost and complexity of information systems, compounded by the growing volume, velocity, and diversity of information has created gaps and vulnerabilities in network defense systems. The number of cyber attacks within the United States alone hit an all-time high in 2014—over 750—in which an individuals' names and social security numbers, driver's license numbers, medical or financial records were stolen or compromised.

Natural language processing (NLP) is a technique that facilitates exchange of information between humans and data processing systems. For example, one branch of NLP pertains to transforming human readable content into machine usable data. For example, NLP engines are presently usable to accept input of unstructured data such as a record of human activity or conversation, and produce data, such as an outline of the input content, most significant and least significant parts, a subject, a reference, dependencies within the content, and the like, from the given content. NLP engines are also presently usable to accept input of structured data such as logs from data processing systems, and produce other data usable in other processes.

For example, another branch of NLP pertains to answering questions about a subject matter based on the information available about the subject matter domain. Such information may be the result of an NLP engine processing, for example, human communications, system logs, and the like. This is the branch of cognitive analytics, and is also referred to as a Question and Answer system (Q and A system). Cognitive analytics is the process of analyzing available information or knowledge to create, infer, deduce, or derive new information.

SUMMARY

The illustrative embodiments provide a method, system, and computer program product. An embodiment includes a method that constructs a first collection, the first collection comprising an analytical feature vector and a Q&A feature vector. The embodiment constructs a second collection from the first collection by inserting noise data in at least one of the analytical feature vector and the Q&A feature vector. The embodiment further constructs a third collection by using at least one of (i) combining, to crossover, at least one of an analytical feature vector and a Q&A feature vector of the second collection with a corresponding at least one of an analytical feature vector and a Q&A feature vector of a fourth collection, wherein the second and the fourth collections have a property similar to one another, and (ii) combining, to migrate, at least one of an analytical feature vector and a Q&A feature vector of the second collection with a corresponding at least one of an analytical feature vector and a Q&A feature vector of a fifth collection, wherein the second and the fifth collections have a property distinct from one another. The embodiment ages, using a forecasting configuration, an analytical feature vector of the third collection to generate a changed analytical feature vector, the changed analytical feature vector containing analytical feature values expected at a future time. The embodiment predicts, by inputting the changed analytical feature vector in a trained neural network, a probability of the cyber-attack occurring at the future time.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a table of example species that can be constructed with neural embeddings in accordance with an illustrative embodiment;

DETAILED DESCRIPTION

Figure 1:
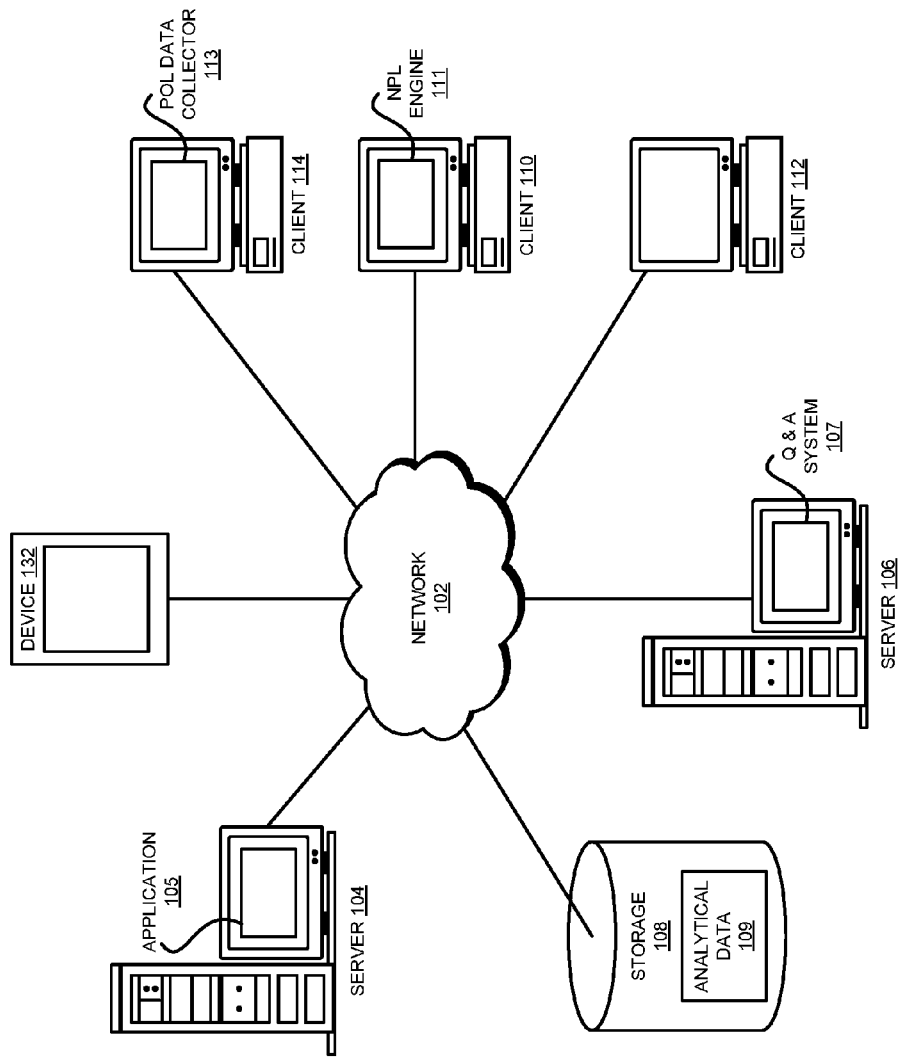
FIG. 1 depicts a block diagram of a network of data processing systems in which illustrative embodiments may be implemented.

The illustrative embodiments recognize that the presently available defenses against cyber attacks are reactionary rather than proactive. By the time a defense system is activated in a data processing environment, an attack has already occurred or is in progress, and some amount of harm to or with a system or data, or theft or malicious use of data, has already occurred in the data processing environment.

Cyber security solutions, technologies and policies today are centered on intrusion and infection prevention, and/or detection and alerting. In other words, the question the presently available cyber security solutions seek to answer is—what is happening right now on my network or internal systems—so that an administrator or a user can take some preventative or forensic action. The primary concern of the presently available solutions is to detect the malicious intent of an attack when it happens, and to prevent the attach from progressing. In the event an attack has progressed far enough, the presently available solutions act to detect the attack, stop further progress of the attack, manage the damage, and remediate the harm caused by the attack.

Some examples of the presently available cyber security solutions include Intrusion Detection Systems (IDS), Intrusion Prevention Systems (IPS), and Security Information and Event Management systems (SIEM). Almost all of the presently available cyber security tools and solutions employ rule and signature based analytical methods to detect known attack activities.

Some presently used solutions come from various classes of IDS. IDSs are commonly classified into "host-based", "network-based", or "hybrid" classes of solutions. Hybrid solutions use some combination of the host-based and network-based approaches.

The host-based systems (HIDS) are used to monitor the behavior of individual machines. HIDS are primarily log-based, but can also perform simple inspection of network traffic. Using an analogy, HIDS inspect "trees" very closely, but they don't know anything about the "forest". They can generate a tremendous amount of data for detecting suspicious behavior by security analysts. The amount of data also increases the burden on the security analyst to find the truly useful information out of the data that they generate.

Network-based systems (NIDS) are network-based and analyze large segments of network traffic. This approach features distributed sensors that sense and report network traffic for assessment to security analysts or other systems/devices. Most NIDS classify traffic based on static rules or signatures created by a vendor analyst that are uploaded periodically to its rules tables. Some of the down sides of NIDS are that they usually require significant storage and still cannot detect attacks that have not been classified by rules or signatures already. For example, a single bit change in a known signature is sufficient to foil a signature based detection of NIDS.

The illustrative embodiments recognize that at least because the presently available solutions do not employ machine learning techniques, it is difficult for these solutions and techniques to adapt in real-time to changing Advanced Persistent Threat (APT) attack vectors or to discover new attack methods. Consequently, the presently available solutions are extremely limited in allowing preventative actions or real-time alerting when previously unknown attacks or attack methods, or changing attack methods are used against a data processing environment.

The illustrative embodiments used to describe the invention generally address and solve the above-described problems and other problems related to predicting and classifying cyber attacks that might occur in a data processing environment at a future time.

An embodiment can be implemented as a software application. The application implementing an embodiment can be configured as a modification of an existing cyber security application, as a separate application that operates in conjunction with an existing cyber security application, a stand-alone application, or some combination thereof.

Within the scope of the illustrative embodiments, analytical data includes data resulting from a data processing system management activity occurring on a data processing system in a data processing environment. In other words, a given data is analytical data if the data is generated by a system in the process of managing an operation of the system, another system, a data communication network or a part thereof. Analytical data characterizes a computing platform in the data processing environment. Some non-limiting examples of the analytical data include network traffic flow measurement information, port scan data, a tally or types of data packets, types of operations being performed by or on the system.

Within the scope of the illustrative embodiments, Pattern of Life (POL) data includes data resulting from a human activity occurring on a data processing system or by using a data processing system in a data processing environment. In other words, a given data is POL data if the data is a direct result of a human activity using the system, another system, a data communication network or a part thereof. POL data characterizes a human activity in the data processing environment. Some non-limiting examples of the POL data include observing or participating in a stock market, observing or participating in a conversation on social media, observing or participating in an online auction, selecting or entering a link to data, manipulating social or economic data, using a data processing system.

Not all analytical data is relevant for detecting or predicting a cyber-attack. Not all POL data is relevant for detecting or predicting a cyber-attack. Generally, analytical data is not in a natural language (NL) form, and POL data includes more natural language content than analytical data. Natural language is written or spoken language having a form that is employed by humans for primarily communicating with other humans or with systems having a natural language interface.

A feature in any data, such as in analytical data or POL data, is a portion of the data that has a specified characteristic. For example, packet velocity is a feature of that portion of analytical data where the data describes a number of packets transiting a point in a network per second. In a similar manner, a type of packets, a type of commands, a numerosity or tally of packets or commands, and many other features can be found in analytical data.

As another example, a feature in POL data is a portion pf the POL data where the data describes a communication having certain keywords. In a similar manner, a type of human activity, a type of conversation, a numerosity or tally of keywords, and many other features can be found in POL data.

A feature is usable for a specific purpose. For example, the packet velocity, a type of packets, a type of commands, a numerosity or tally of packets or commands, a type of human activity, a type of conversation, a numerosity or tally of keywords, and other similarly purposed features are usable for detecting or predicting a cyber-attack.

An expanded feature is a feature that is either derived from one or more other features, or is inferred from one or more other features. For example, if packet velocity is a feature, then a rate of change of packet flow, to wit, packet acceleration, can be regarded as an expanded feature, which is derivable from the packet velocity.

An embodiment collects analytical data from a data processing environment. The embodiment extracts a set of features—also referred to as raw features—from the analytical data. The raw features are selected based on one or more rules configured to select those data portions from the analytical data that are relevant to detecting or predicting cyber attacks. The embodiment generates a set of expanded features from the set of raw features. The embodiment constructs a feature vector, herein after referred to as the V vector corresponding to the analytical data. The V vector includes the set of raw features extracted from the analytical data and the set of expanded features generated from the raw features. The embodiment generates a $V_t$ vector corresponding to the V vector by adding to the V vector a timestamp of the time at which the analytical data was collected from the data processing environment. The embodiment stores the $V_t$ vector in a repository, e.g., a database. The $V_t$ vector is also Interchangeably referred to herein as the analytical feature vector.

An embodiment collects POL data from a data processing environment. The embodiment extracts a set of raw features from the POL data. The raw features are selected based on one or more rules configured to select those data portions from the POL data that are relevant to detecting or predicting cyber attacks. The embodiment generates a set of expanded features from the set of raw features. The embodiment constructs a feature vector, herein after referred to as the U vector corresponding to the POL data. The U vector includes the set of raw features extracted from the POL data and the set of expanded features generated from the raw features. The embodiment generates a $U_t$ vector corresponding to the U vector by adding to the U vector a timestamp of the time at which the POL data was collected from the data processing environment. The embodiment stores the $U_t$ vector in a repository, e.g., a database. The repository of the $U_t$ vector may be, but need not necessarily be the same repository where the $V_t$ vector is stored. The $U_t$ vector is also interchangeably referred to herein as the POL feature vector.

Note that the availability of both—the analytical data and the POL data—is not necessary. One embodiment uses only the analytical data and produces only the $V_t$ vector. Another embodiment uses only the POL data and produces only the $U_t$ vector. Another embodiment uses both—the analytical data and the POL data—and produces both $V_t$ and $U_t$ vectors.

At least some portions of the analytical data are suitable for NLP. Preferably, at least some of such portions from the analytical data are stored or identified in the $V_t$ vector. Similarly, at least some portions of the POL data are suitable for NLP. Preferably, at least some of such portions from the POL data are stored or identified in the $U_t$ vector.

An embodiment uses one or more rules to identify and select such NLP-suitable portions from the stored $V_t$, $U_t$, or both, as the case may be. For example, one non-limiting NLP-suitability rule may determine that a portion of $V_t$ (or $U_t$) is suitable for NLP if the portion includes data arranged in a sentence-structure according to a given grammar. From this disclosure, many other NLP-suitability rules will become apparent and the same are contemplated within the scope of the illustrative embodiments.

The NLP-suitable portions selected in this manner from $V_t$ form $V_t'$. The NLP-suitable portions selected in this manner from $U_t$ form $U_t'$. Using an NLP engine, the embodiment generates natural language corpora from $V_t'$ alone, $U_t'$ alone, or both $V_t'$ and $U_t'$, as the case may be.

Another embodiment generates one or more questions that are relevant to detecting or predicting cyber attacks. Preferably, the questions in the set of questions are natural language questions and are derived from $V_t'$, $U_t'$ or $V_t'$ and $U_t'$, as the case may be.

The embodiment further makes the NL corpora and the set of questions available to a Q&A system. The Q&A system produces an answer to a question from the set of questions based on the corpora. In one embodiment, the answer is a ranked list of natural language portions of the corpora that are responsive to the question. As an example, the ranking is indicative of an amount of relevance of the ranked portion to the question. As another example, the ranking is indicative of a confidence of the Q&A system in the relevance of the ranked portion to the question.

The embodiment extracts a set of raw features from the ranked list of portions of the corpora. The raw features are selected based on one or more rules configured to select those data portions from $V_t'$ and/or $U_t'$ that are relevant to answering specific questions in detecting or predicting cyber attacks. The embodiment generates a set of expanded features from the set of raw features. The embodiment constructs a feature vector, herein after referred to as the W vector corresponding to the corpora. The W vector includes the set of raw features extracted from the corpora and the set of expanded features generated from those raw features. The embodiment generates a $W_t$ vector corresponding to the W vector by adding to the W vector a timestamp of the time at which the analytical data and/or the POL data was collected from the data processing environment. The embodiment stores the $W_t$ vector in a repository, e.g., a database. The repository of the $W_t$ vector may be, but need not necessarily be the same repository where the $V_t$ and or $U_t$ vectors are stored. The $W_t$ vector is also interchangeably referred to herein as the Q&A feature vector.

Each of the $V_t$, $U_t$, and $W_t$ vectors is also referred to herein as a neural embedding. A collection includes some combination of neural embeddings. For example, consider that a neural embedding was regarded as a chromosome, and a collection were regarded as an organism. $V_t$ neural embedding is a V chromosome, $U_t$ neural embedding is a U chromosome, and $W_t$ neural embedding is a W chromosome.

In an embodiment where only the V chromosome and the w chromosome are available, an organism—the VW organism—includes the V and the W chromosomes. In an embodiment where only the U chromosome and the w chromosome are available, an organism—the UW organism—includes the U and the W chromosomes. In an embodiment where the V chromosome, the U chromosome, and the w chromosome are all available, an organism—the UVW organism—includes the U, the V, and the W chromosomes.

A collection has a type. Accordingly, in the biological analogy, an organism is of a species. Variations in one or more chromosomes can lead to the same or different species of the organism.

A species of an organism (type of a collection) is a function that the collection can perform. For example, a collection can be configured such that the collection has a recall only or precision only function. In a similar manner, a collection can have an accuracy function, a biased recall function, and a biased precision function.

Recall is a fraction of relevant instances that are retrieved, and precision is the fraction of retrieved instances that are relevant. Precision can be seen as a measure of exactness or quality, whereas recall is a measure of completeness or quantity. Maximum precision indicates no false positives, and maximum recall indicates no false negatives.

Stated in terms of predicted events, a recall-oriented tier seeks to maximize in an output set of predicted events, predicting as many events that are relevant or related to the process being simulated. Stated in terms of predicted events, a precision-oriented tier seeks to maximize in an output set of predicted events, those predicted events that are relevant or related to the process being simulated.

An objective of evolving a collection (organism) is to maximize the function of the collection. As in biological evolution, collections of vectors can be evolved by using one or more operations of the illustrative embodiments described herein. Such disclosed operations create variations in the chromosomes of the available organisms.

An embodiment initiates the variations in the chromosomes to create other organisms by mutating an available chromosome in an initial organism. For example, suppose that in one embodiment, the organism is a UW organism. The embodiment mutates one or both chromosomes, for example, the U chromosome, by inserting random noise data into the $U_t$ vector. Similarly, to mutate the W chromosome, the embodiment inserts random noise in to the $W_t$ vector. Insertion of noise is either adding a random value to a vector, removing an existing value from the vector, randomly modifying an existing value in the vector, or some combination thereof.

As another example, suppose that in another embodiment, the organism is a VW organism. The embodiment mutates one or both chromosomes, for example, the V chromosome, by inserting random noise data into the $V_t$ vector. Similarly, to mutate the W chromosome, the embodiment inserts random noise in to the $W_t$ vector.

As another example, suppose that in another embodiment, the organism is a UVW organism. The embodiment mutates all or a subset of chromosomes, for example, the V chromosome, by inserting random noise data into the $V_t$ vector. Similarly, to mutate the U or the W chromosome, the embodiment inserts random noise in to the $U_t$ or the $W_t$ vector, respectively.

The mutated vectors (chromosomes) are also stored in a repository. Once a chromosome has been mutated, a collection (organism) that includes the mutated chromosome is essentially a different organism. The original organism and the different organism may be of the same species or different species.

Once sufficient variations of vectors are available to construct at least two organisms (collections), one embodiment progresses the evolution beyond mutation and creates additional organisms by crossing over chromosomes, further mutating the chromosomes of an organism, or via a combination of mutation and crossover. The crossover method of evolution works between organisms of the same species.

For example, assume that organism O1 has chromosomes U1 and W1, and organism O2 has chromosomes U2 and W2. O1 and O2 are of the same species. A single chromosome is used as a non-limiting example to describe the crossover evolution with clarity. Any number of chromosomes can be crossed over in a similar manner. Assume that a chromosome, e.g., the U chromosome, is to be crossed over. The embodiment divides U1 into example two portions U11 and U12. Correspondingly, the embodiment divides U2 of O2 into two corresponding portions U21 and U22. The sizes of U11 and U21 are identical to one another. The sizes of U12 and U22 are identical to one another. The embodiment combines U11 with U22 to crossover the U chromosome. Alternatively, the embodiment can combine U21 with U12 to crossover the U chromosome as well. U11+U22 will yield a different organism than U21+U12.

In a similar manner, another embodiment can cross over the V chromosome, the w chromosome, or both in a VW organism. In a similar manner, another embodiment can cross over the U chromosome, the V chromosome, the w chromosome, or some combination thereof in a UVW organism.

Once sufficient variations of vectors are available to construct at least two organisms (collections), one embodiment progresses the evolution beyond mutation and creates additional organisms by migrating chromosomes, further mutating the chromosomes of an organism, or via a combination of mutation and migration. The migration method of evolution works between organisms of different species.

For example, assume that organism O1 has chromosomes U1 and W1, and organism O2 has chromosomes U2 and W2. O1 and O2 are of different species. A single chromosome is used as a non-limiting example to describe the migration evolution with clarity. Any number of chromosomes can be migrated in a similar manner. Assume that a chromosome, e.g., the U chromosome, is to be migrated. The embodiment divides U1 into example two portions U11 and U12. Correspondingly, the embodiment divides U2 of O2 into two corresponding portions U21 and U22. The sizes of U11 and U21 are identical to one another. The sizes of U12 and U22 are identical to one another. The embodiment combines U11 with U22 to migrate the U chromosome. Alternatively, the embodiment can combine U21 with U12 to migrate the U chromosome as well. U11+U22 will yield a different organism than U21+U12.

In a similar manner, another embodiment can migrate the V chromosome, the w chromosome, or both in a VW organism. In a similar manner, another embodiment can migrate the U chromosome, the V chromosome, the w chromosome, or some combination thereof in a UVW organism.

An embodiment trains an Artificial Neural Network (ANN)—also referred to simply as a neural network—for cyber-attack prediction and classification. An ANN is a computing system made up of a number of simple, highly interconnected processing elements, which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior. Preferably, the neural network that the embodiment trains is a feed forward neural network. A feedforward neural network is an artificial neural network where connections between the units do not form a cycle.

To construct training data to train the neural network one embodiment extracts from the analytical data that data which was captured during an actual cyber-attack, or which is indicative of a known cyber-attack. From such extracted analytical data, the embodiment constructs the V chromosome and the W chromosome. The embodiment constructs a training organism with the constructed V and W chromosomes. Using the training organisms, the embodiment trains a neural network to produce a detection indication of the known attack and a corresponding classification of the known attack.

A number of training organisms are similarly constructed using data of a corresponding number of known attacks. The embodiment trains the neural network to produce detection indications of the known attacks and the corresponding classifications of the known attacks. A trained neural network results from this exercise.

Back to the organisms constructed through evolution—an embodiment ages an organism from time T1 to time T2, with an objective to predict a cyber-attack that is likely to occur at time T2.

For example, suppose an organism O1 has chromosomes (U1, V1, W1) at time T1. An embodiment ages O1 by forecasting a chromosome, e.g., chromosome U1, to form vector U2 and time T2. In other words, the embodiment forecasts what the values in vector U2 will be at time T2, given the values in vector U1 at time T1. Any suitable forecasting model can be utilized for this purpose. One or more chromosomes can be forecasted for their states at time T2 in a similar manner. The aged organism O2 has chromosomes (U2, V2, W2) at time T2.

Any number of aged organisms can be constructed in this manner for any future times. For example, O1 at T1 ages to O2 at T2, to O3 at T3, and so on up to On at Tn. Furthermore, the example described here is with respect to an organism that includes the U, V, and the W chromosomes only as a non-limiting example. In embodiments where the organisms are UW organisms or VW organisms, the embodiments ages those available UW or VW organisms in a similar manner using only the available chromosomes.

Back to the example aged organism O2 with U2, V2, and W2 chromosomes—an embodiment provides aged chromosomes U2, V2, W2, or some combination thereof, to the trained neural network. The trained neural network produces a prediction of a cyber-attack occurring (or not occurring) at time T2. The trained neural network also produces a probability or a confidence that the predicted cyber-attack will occur (or not occur) at time T2. The trained neural network also produces a classification of the cyber-attack that is predicted to occur (or not occur) at time T2. For example, the trained neural network may predict that a denial of service class of cyber-attack is likely with a confidence of 63% (0.63 probability) at time T2. As another example, the trained neural network may predict that a Trojan class of cyber-attack is likely with a confidence of 13% (0.13 probability, therefore unlikely) at time T2.

A method of an embodiment described herein, when implemented to execute on a device or data processing system, comprises substantial advancement of the functionality of that device or data processing system towards predicting future cyber attacks. For example, presently available methods for detecting cyber attacks are limited to reacting to an attack that either has already occurred or is in progress. An embodiment provides a method by which existing data in a data processing environment can be used to predict a cyber-attack in the future. This manner of forecasting and classifying cyber attacks using analytical data based neural embeddings is unavailable in the presently available methods. Thus, a substantial advancement of such devices or data processing systems by executing a method of an embodiment is in proactively defending against cyber threats that have not yet materialized in a data processing environment.

The illustrative embodiments are described with respect to certain types of data, vectors, features, expanded features, rules, suitability for NLP, Q&A methods, collections or organisms, numbers and types of vectors or chromosomes, evolution of the collections, type of neural networks, training method of a neural network, aging of a collection, predictions, probabilities, classes of cyber attacks, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
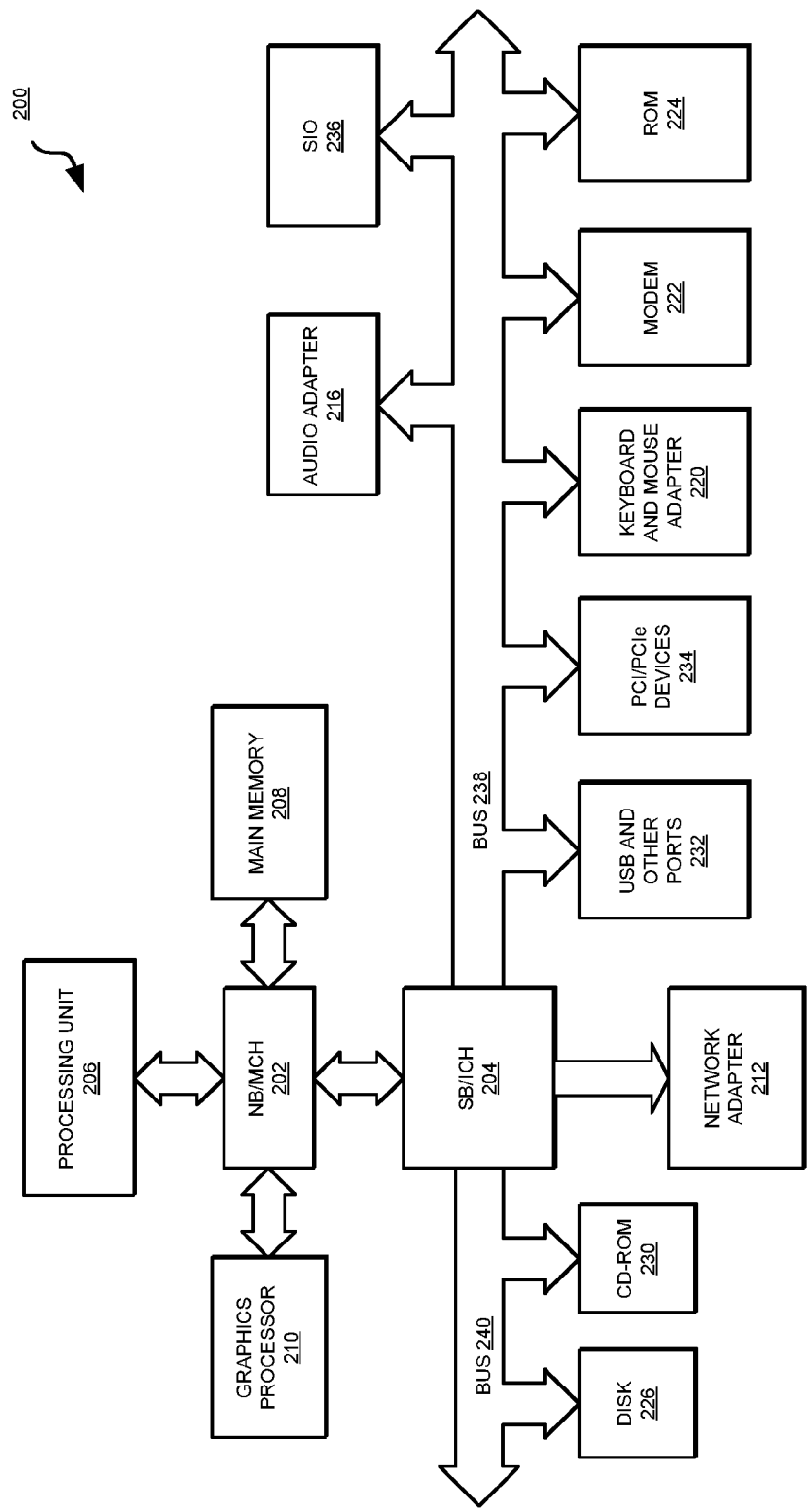
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Q&A system 107 is a Q&A system suitable for performing a function described herein. IBM's Watson is one example of Q&A system 107 (IBM and Watson are trademarks of International Business Machines in the United States and other countries). NLP engine 111 is an NLP system suitable for performing a function described herein. Analytical data 109 is example analytical data available in data processing environment 100 and usable in a manner described herein. POL data collector 113 operates to collect POL data in data processing environment 100.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3A:
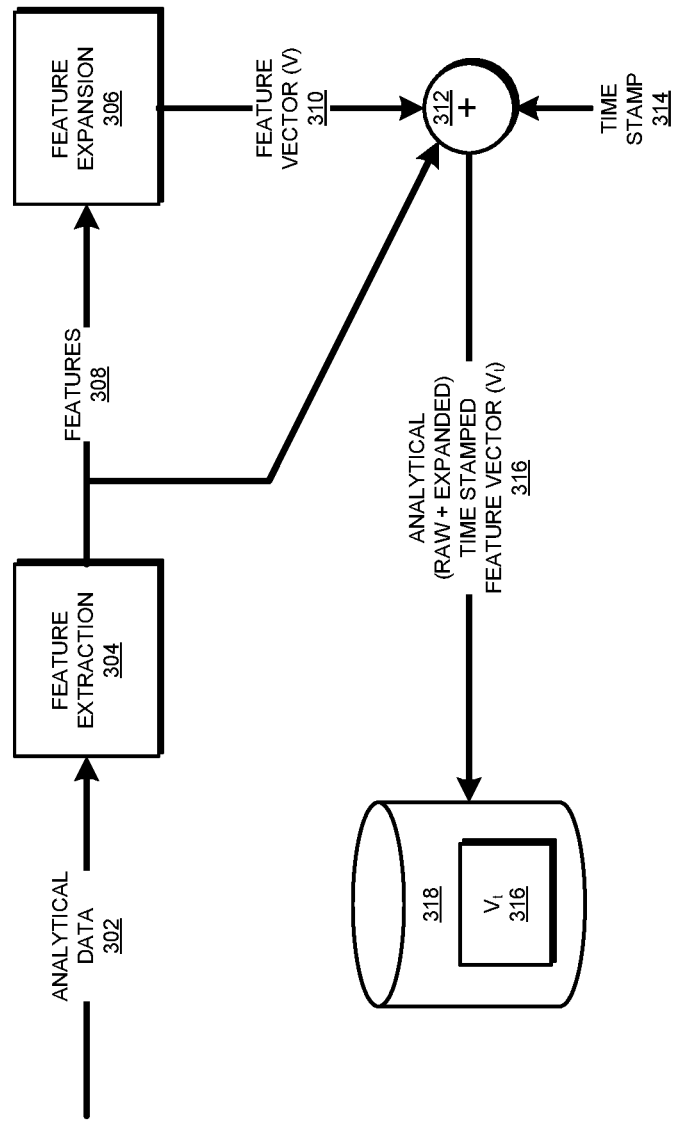
FIG. 3A depicts a block diagram of an example process of creating an analytical feature vector in accordance with an illustrative embodiment.

With reference to FIG. 3A, this figure depicts a block diagram of an example process of creating an analytical feature vector in accordance with an illustrative embodiment. Analytical data 302 is an example of analytical data 109 in FIG. 1. Operations 304 and 306 can be implemented in application 105 in FIG. 1.

Feature extraction operation 304 accepts analytical data 302 as input and extracts set of features 308. Feature expansion operation 306 expands a subset of set 308 of features. Feature vector 310 includes a set of expanded features resulting from operation 306.

As a separate operation or as a part of operation 306, combining operation 312 combines feature vector 310, set of features 308—which are raw features, and timestamp 314—which is indicative of a time of capturing analytical data 302. Combining operation 312 produces analytical feature vector $V_t$ 316, which is timestamped. The combining operation stores, or makes available for storing, $V_t$ 316 in repository 318.

Figure 3B:
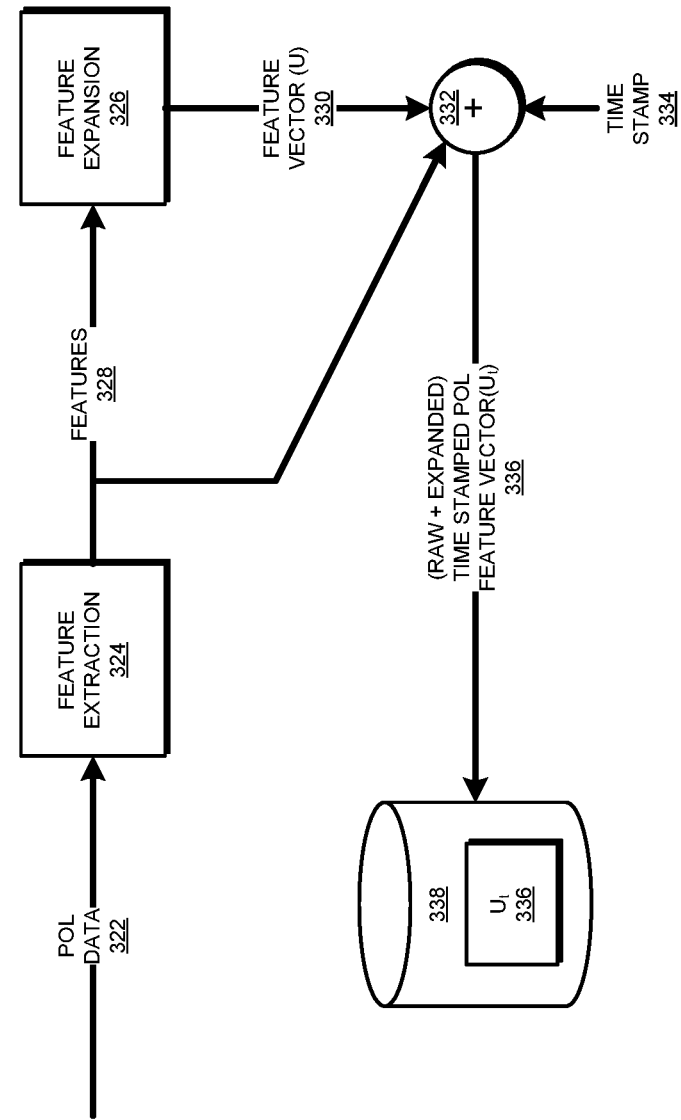
FIG. 3B depicts a block diagram of an example process of creating a POL feature vector in accordance with an illustrative embodiment.

With reference to FIG. 3B, this figure depicts a block diagram of an example process of creating a POL feature vector in accordance with an illustrative embodiment. POL data 322 is an example of POL data collected by POL data collector 113 in FIG. 1. Operations 324 and 326 can be implemented in application 105 in FIG. 1.

Feature extraction operation 324 accepts POL data 322 as input and extracts set of features 328. Feature expansion operation 326 expands a subset of set 328 of features. Feature vector 330 includes a set of expanded features resulting from operation 326.

As a separate operation or as a part of operation 326, combining operation 332 combines feature vector 330, set of features 328—which are raw features, and timestamp 334—which is indicative of a time of capturing POL data 322.

Combining operation 332 produces POL feature vector $U_t$ 336, which is timestamped. The combining operation stores, or makes available for storing, $U_t$ 336 in repository 338. Repository 338 may be, but need not be, the same as repository 318 in FIG. 3A.

Figure 3C:
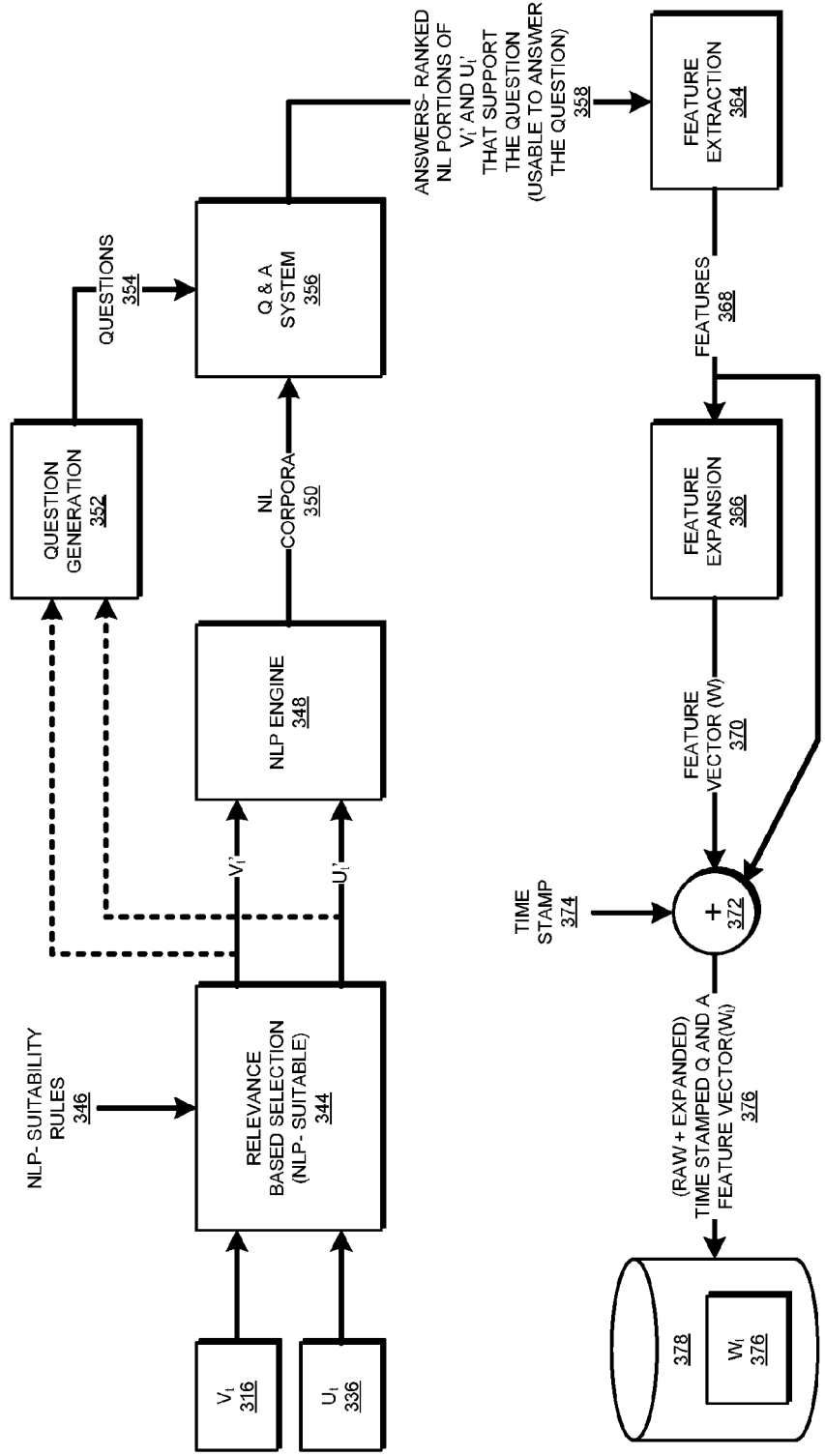
FIG. 3C depicts a block diagram of another example process of creating a Q&A feature vector in accordance with an illustrative embodiment.

With reference to FIG. 3C, this figure depicts a block diagram of another example process of creating a Q&A feature vector in accordance with an illustrative embodiment. $V_t$ 316 is obtained from repository 318 in FIG. 3A. $U_t$ 336 is obtained from repository 338 in FIG. 3B. Operations 344 can be implemented in application 105 in FIG. 1.

The depiction of FIG. 3C uses both $V_t$ and $U_t$ only as a non-limiting example. As described herein, an embodiment can be configured to produce, and use, only $V_t$ or only $U_t$ by using only the analytical data or only the POL data, respectively. From this disclosure, those of ordinary skill in the art will be able to modify the process depicted in FIG. 3C to use only $V_t$ or only $U_t$ by removing the paths and processing of the absent vector, and such modifications are contemplated within the scope of the illustrative embodiments.

Selection operation 344 accepts $V_t$ 316 and $U_t$ 336 as inputs and selects NLP-suitable portions $V_t'$ and $U_t'$, respectively. Selection operation 344 uses one or more NLP-suitability rules 346 in performing this operation as described herein.

NLP engine 348 is an example of NLP engine 11 in FIG. 1 and accepts $V_t'$ and $U_t'$ as inputs to produce NL corpora 350 in a manner described herein. Question generation operation 352 produces one or more questions 354 from $V_t'$ and $U_t'$.

Q&A system 356 is an example of Q&A system 107 in FIG. 1. Using NL corpora 350 to answer a question from questions 354, Q&A system 356 produces an answer in answers 358. As described herein, an answer in answers 358 is a ranking of natural language portions of $V_t'$ and/or $U_t'$, as the case may be, which are usable to answer a corresponding question.

Feature extraction operation 364 accepts one or more answers 358 as input and extracts set of features 368.

Feature expansion operation 366 expands a subset of set 368 of features. Feature vector 370 includes a set of expanded features resulting from operation 366.

As a separate operation or as a part of operation 366, combining operation 372 combines feature vector 370, set of features 368—which are raw features, and timestamp 374—which is indicative of a time of capturing the analytical data and/or the POL data that resulted in $V_t$ 316 and/or $U_t$ 336. Combining operation 372 produces Q&A feature vector $W_t$ 376, which is timestamped. The combining operation stores, or makes available for storing, Wt 376 in repository 378. Repository 378 may be, but need not be, the same as repository 318 in FIG. 3A or repository 338 in FIG. 3B.

Figure 4A:
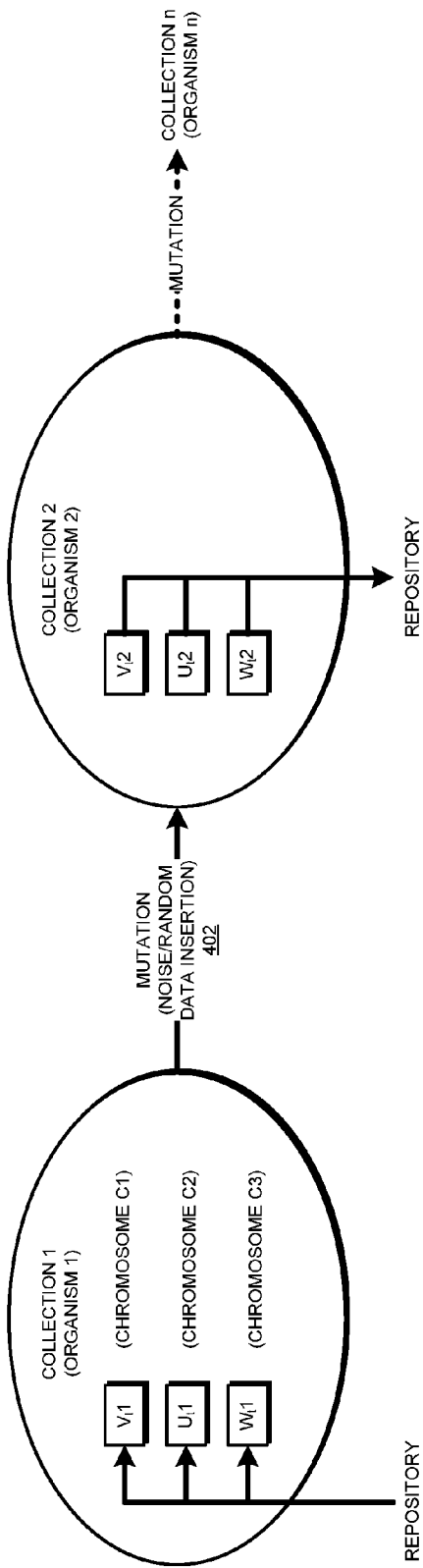
FIG. 4A depicts a block diagram of a process of evolving a collection of neural embeddings in accordance with an illustrative embodiment.

With reference to FIG. 4A, this figure depicts a block diagram of a process of evolving a collection of neural embeddings in accordance with an illustrative embodiment. Collection 1 (organism 1 or O1) is formed using $V_t$ 316 (labeled $V_t1$) from FIG. 3A, $U_t$ 336 (labeled $U_t1$) from FIG. 3B, and $W_t$ 376 (labeled $W_t1$) from FIG. 3C. $V_t1$ forms chromosome C1 of O1; $U_t1$ forms chromosome C2 of O1; and $W_t1$ forms chromosome C3 of O1.

Figure 4B:
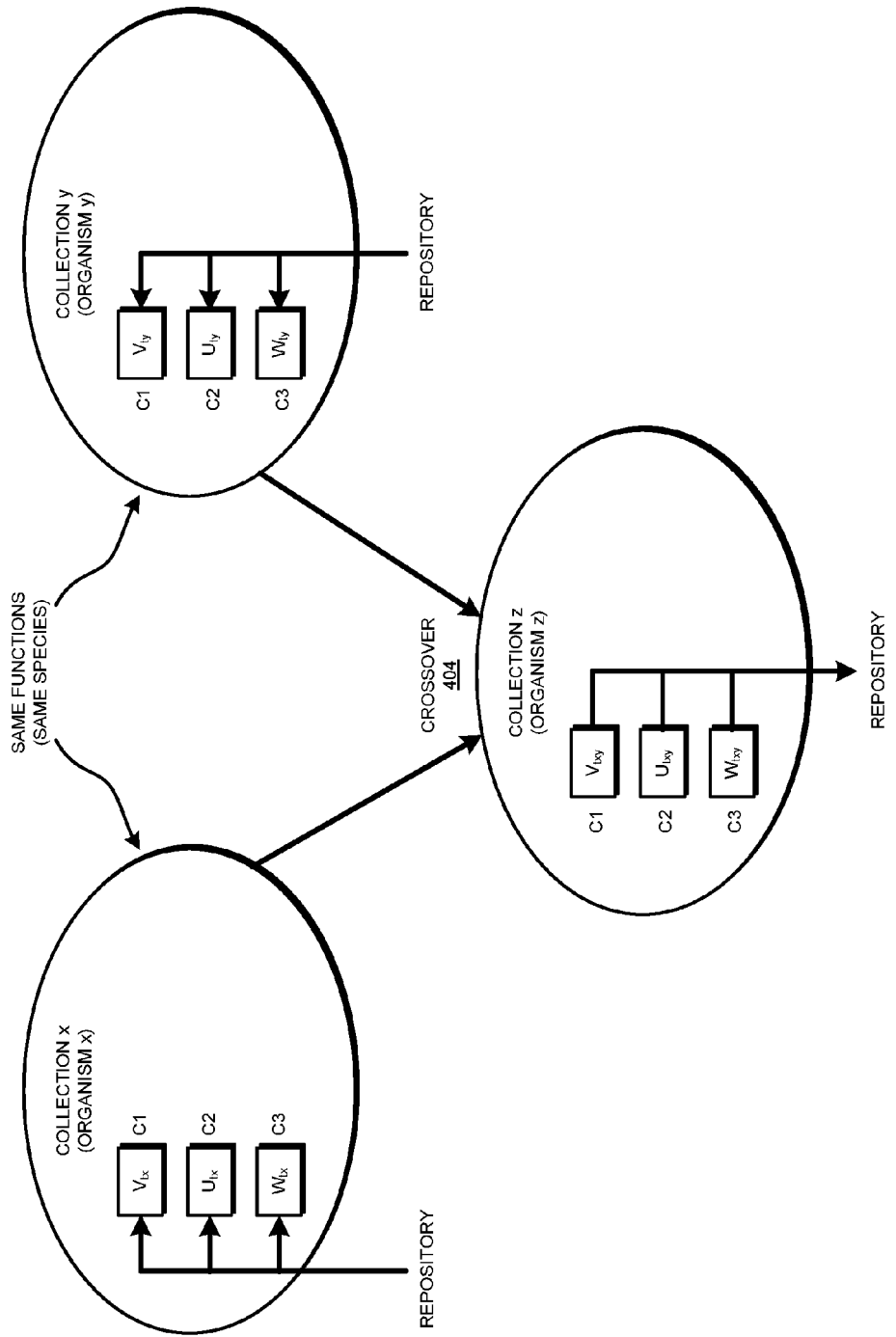
FIG. 4B depicts a block diagram of another process of evolving a collection of neural embeddings in accordance with an illustrative embodiment.
Figure 4C:
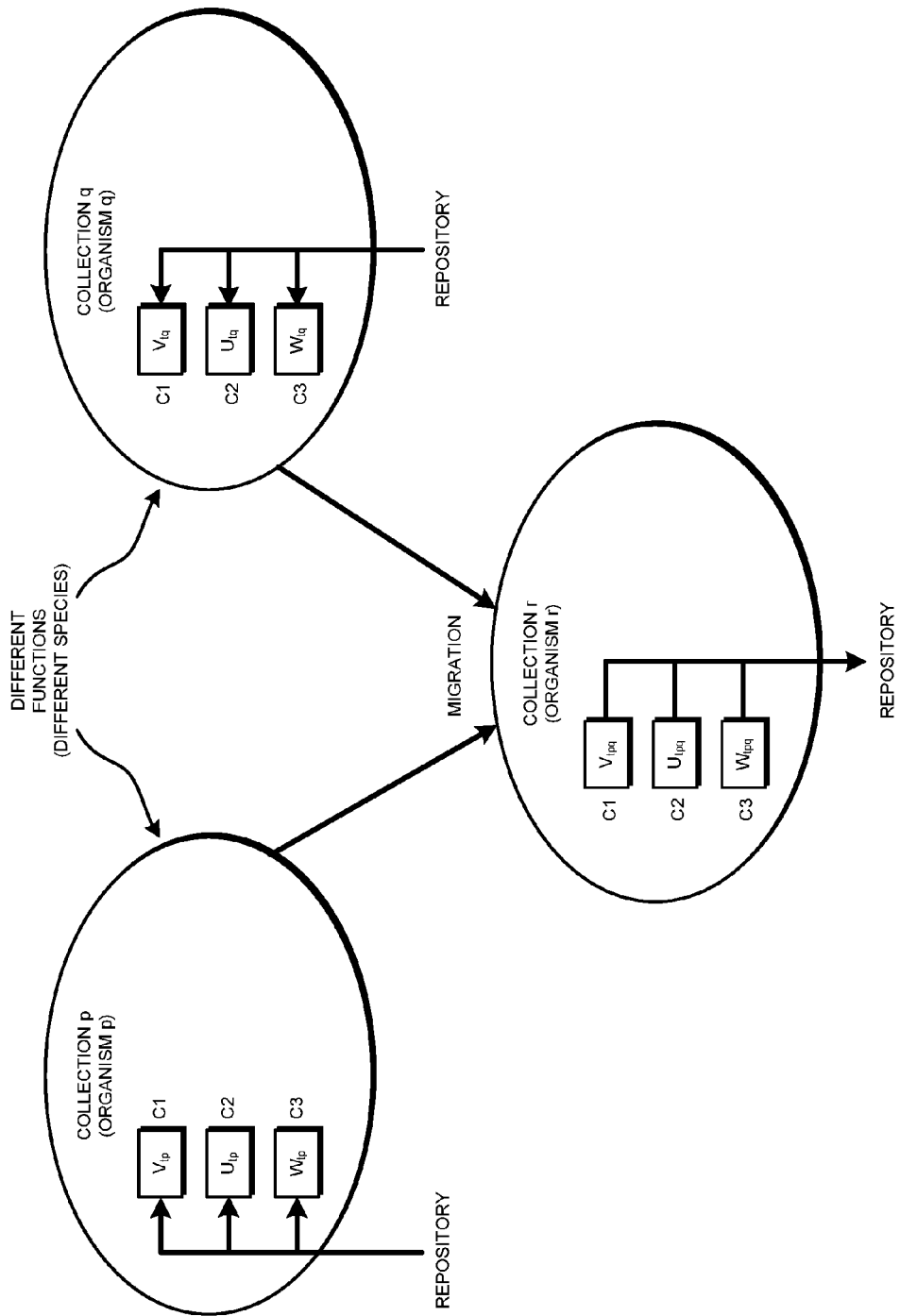
FIG. 4C depicts a block diagram of another process of evolving a collection of neural embeddings in accordance with an illustrative embodiment.

The depiction of FIGS. 4A-C use both $V_t$ and $U_t$ vectors with the $W_t$ vector only as a non-limiting example. As described herein, an embodiment can be configured to produce, and use, organisms with only ($V_t$, $W_t$) or only ($U_t$, $W_t$) based on only the analytical data or only the POL data, respectively. From this disclosure, those of ordinary skill in the art will be able to modify the process depicted in FIGS. 4A-C to use only $V_t$ and $W_t$ vectors (chromosomes C1 and C3) or only $U_t$ and $W_t$ vectors (chromosomes C2 and C3) by removing absent vector from the process, and such modifications are contemplated within the scope of the illustrative embodiments.

Organism 1 acts as the original organism for a mutation iteration. Application 105 performs mutation operation 402 one or more of chromosomes C1, C2, and C3 of O1. Mutation 402 results in collection 2 (organism 2 or O2), which has vectors $V_t2$, $U_t2$, and $W_t2$ (changed chromosomes C1, C2, and C3 respectively). If, as an example, mutation 402 operates on only vector $V_t1$, then $V_t1$ changes to $V_t2$ but $U_t1$ and $U_t2$ remain identical to one another, and $W_t1$ and $W_t2$ remain identical to one another. Likewise, only those vectors in organism 2 are changed on which mutation 402 operates.

The chromosomes of organism 2 are stored in a repository, such as in the repository from where the chromosomes of organism 1 were obtained. Organism 2 can act as the original organism for another mutation iteration. Any number of mutations can occur in this manner, resulting in collection n (organism n).

With reference to FIG. 4B, this figure depicts a block diagram of another process of evolving a collection of neural embeddings in accordance with an illustrative embodiment. Collection x (organism x or Ox) is formed using $V_tx$, $U_tx$, and $W_tx$. Collection y (organism y or Oy) is formed using $V_ty$, $U_ty$, and $W_ty$. Ox and Oy are of the same species.

$U_tx$, $V_tx$, and $W_tx$, and $U_ty$, $V_ty$, and $W_ty$ may be the result of any combination of the operations described with respect to FIGS. 4A-C. For example, $V_tx$, $U_tx$, and $W_tx$ vectors may be the result of one or more iterations of mutation 402 of FIG. 4A, one or more crossover operation 404 of FIG. 4B, one or more migration operation 406 of FIG. 4C, or some combination thereof. Similarly, $V_ty$, $U_ty$, and $W_ty$ vectors may be the result of one or more iterations of mutation 402 of FIG. 4A, one or more crossover operation 404 of FIG. 4B, one or more migration operation 406 of FIG. 4C, or some combination thereof.

One embodiment only uses mutation 402 and crossover 404 operations to create organisms Ox and/or Oy. Another embodiment only uses mutation 402 and migration 406 operations to create organisms Ox and/or Oy.

Application 105 performs crossover operation 404 on organism x and organism y as described herein. Crossover operation 404 combines one or more of chromosomes C1, C2, and C3 of Ox with the corresponding chromosome in Oy. Crossover 404 results in collection z (organism z or Oz), which has vectors $V_txy$, $U_txy$, and $W_txy$ (changed chromosomes C1, C2, and C3 respectively). If, as an example, crossover 404 operates on only vector $V_tx$ and $V_ty$, then $V_tx$ and $V_ty$ are each different from $V_txy$, but $U_txy$ is either identical to $U_tx$ or $U_ty$, and $W_txy$ is either identical to $W_tx$ or $W_ty$. Likewise, only those vectors in organism z are changed on which crossover 404 operates.

The chromosomes of organism z are stored in a repository, such as in the repository from where the chromosomes of organisms ox and oy were obtained. Organism z can participate in another crossover operation with another organism for another crossover iteration. Any number of crossovers can occur in this manner. Organism r can also mutate. Organism r can also participate in a migration operation with another organism when crossover 404 and migration 406 are both supported in an embodiment.

With reference to FIG. 4C, this figure depicts a block diagram of another process of evolving a collection of neural embeddings in accordance with an illustrative embodiment.

Collection p (organism p or Op) is formed using $V_t p$, $U_t p$, and $W_t p$. Collection q (organism q or Oq) is formed using $V_t q$, $U_t q$, and $W_t q$. Ox and Oy are of the different species.

$U_t p$, $V_t p$, and $W_t p$, and $U_t q$, $V_t q$, and $W_t q$ may be the result of any combination of the operations described with respect to FIGS. 4A-C. For example, $V_t p$, $U_t p$, and $W_t p$ vectors may be the result of one or more iterations of mutation 402 of FIG. 4A, one or more crossover operation 404 of FIG. 4B, one or more migration operation 406 of FIG. 4C, or some combination thereof. Similarly, $V_t q$, $U_t q$, and $W_t q$ vectors may be the result of one or more iterations of mutation 402 of FIG. 4A, one or more crossover operation 404 of FIG. 4B, one or more migration operation 406 of FIG. 4C, or some combination thereof.

One embodiment only uses mutation 402 and crossover 404 operations to create organisms Op and/or Oq. Another embodiment only uses mutation 402 and migration 406 operations to create organisms Op and/or Oq.

Application 105 performs migration operation 406 on organism p and organism q as described herein. Migration operation 406 combines one or more of chromosomes C1, C2, and C3 of Op with the corresponding chromosome in Oq. Migration 406 results in collection r (organism r or Or), which has vectors $V_t pq$, $U_t pq$, and $W_t pq$ (changed chromosomes C1, C2, and C3 respectively). If, as an example, migration 406 operates on only vector $V_t p$ and $V_t q$, then $V_t p$ and $V_t q$ are each different from $V_t pq$, but $U_t pq$ is either identical to $U_t p$ or $U_t q$, and $W_t pq$ is either identical to $W_t p$ or $W_t q$. Likewise, only those vectors in organism r are changed on which migration 406 operates.

The chromosomes of organism r are stored in a repository, such as in the repository from where the chromosomes of organisms Op and Oq were obtained. Organism r can participate in another migration operation with another organism for another migration iteration. Any number of migrations can occur in this manner. Organism r can also mutate. Organism r can also participate in a crossover operation with another organism when crossover 404 and migration 406 are both supported in an embodiment.

With reference to FIG. 5, this figure depicts a table of example species that can be constructed with neural embeddings in accordance with an illustrative embodiment.

Column 502 lists various example species, and column 504 lists their corresponding objective functions. As an example, row 506 shows under column 502 a species that has a recall only function. Row 506 under column 504 an objective function to maximize the recall capabilities of the species. Other rows similarly show other example species and their corresponding objective function.

Figure 6A:
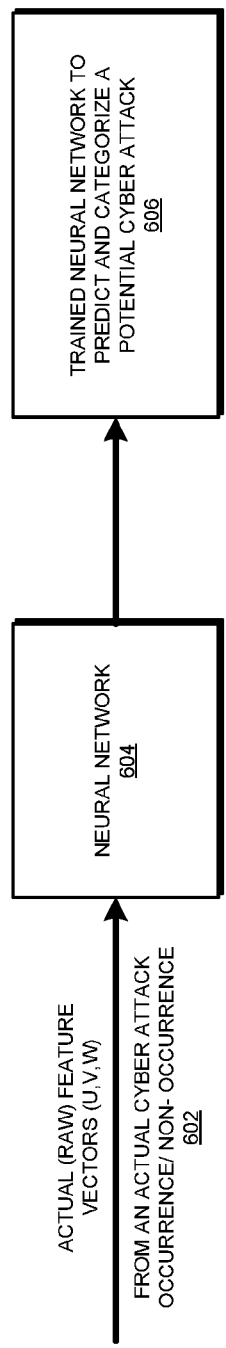
FIG. 6A depicts a block diagram of an example process of training a neural network for predicting and classifying a future cyber-attack in accordance with an illustrative embodiment.

With reference to FIG. 6A, this figure depicts a block diagram of an example process of training a neural network for predicting and classifying a future cyber-attack in accordance with an illustrative embodiment. Application 105 in FIG. 1 constructs feature vectors 602 in a manner similar to the construction of feature vectors $V_t$, $U_t$, and $W_t$ as described in FIGS. 3A-C. Specifically, each of the feature vectors U, V, and w of input 602 are derived from actual features of actual occurrence and/or actual non-occurrence of one or more cyber attacks on the given data processing environment.

For example, feature vector V is derived from the analytical data corresponding to actual occurrence/non-occurrence of one or more types of one or more cyber attacks. Similarly, feature vector U is derived from the POL data corresponding to actual occurrence/non-occurrence of one or more types of one or more cyber attacks.

In the embodiments where only analytical data is used, input 602 includes feature vector V and feature vector W derived therefrom. In the embodiments where only POL data is used, input 602 includes feature vector U and feature vector W derived therefrom. In the embodiments where analytical data and POL data are used, input 602 includes feature vector V, feature vector U, and feature vector W derived using both U and V.

Neural network 604 is a feed forward neural network. The application provides input 602 as a training input to train neural network 604 in correctly producing an affirmative prediction of an occurrence of an actual attack that was observed in the data processing environment. Input 602 also trains neural network 604 in producing a probability or confidence of the prediction that correctly corresponds with an occurrence of an actual attack that was observed in the data processing environment. Input 602 also trains neural network 604 in producing a classification of the predicted attack that correctly corresponds with a class of an actual attack that was observed in the data processing environment.

Any number of inputs similar to input 602 can be used in such training. The training exercise produces trained neural network 606, which can predict, with a corresponding confidence level, a future attack, and also classify the predicted attack.

Figure 6B:
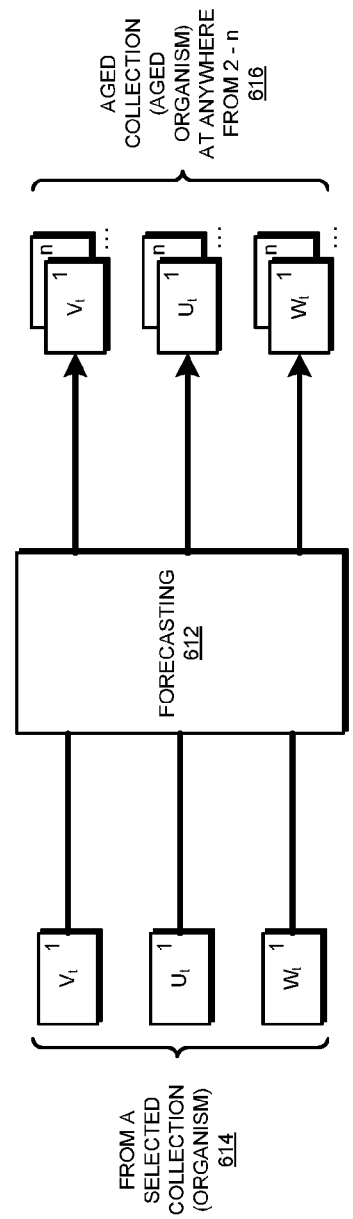
FIG. 6B depicts an example process for aging the data to predict a future cyber-attack in accordance with an illustrative embodiment.

With reference to FIG. 6B, this figure depicts an example process for aging the data to predict a future cyber-attack in accordance with an illustrative embodiment. Operation 612 can be implemented in application 105 in FIG. 1. Vectors $U_t$, $V_t$, and $W_t$ are from collection 614, which has been created using a combination of the evolutionary processes described with respect to FIGS. 4A-C. Again, collection 614 having $U_t$, $V_t$, and $W_t$ vectors is only a non-limiting example. In the embodiments where only analytical data is used, collection 614 includes vector $V_t$ and vector $W_t$. In the embodiments where only POL data is used, collection 614 includes vector $U_t$ and vector $W_t$. In the embodiments where analytical data and POL data are used, collection 614 includes vector $V_t$, vector $U_t$, and vector $W_t$ derived using both $U_t$ and $V_t$.

Organism 614 exists at time T1, hence each of vectors $U_t$, $V_t$, and $W_t$ of organism 614 are labeled "1" in the upper right corner. Forecasting operation 612 forecasts a future state of some or all of vectors $U_t$, $V_t$, and $W_t$ as they change from time T1 to time Tn. Output 616 includes one or more collections. For example, a collection in output 616 represents the forecasted collection at time T2, and includes forecasted vectors $U_t$, $V_t$, and $W_t$ at time T2. In this manner, a collection in output 616 represents the forecasted collection at time Tn, and includes forecasted vectors $U_t$, $V_t$, and $W_t$ at time Tn (labeled "n" in the upper right corner).

Different vectors may be forecasted differently using different forecasting methods or forecasting configurations—e.g., one vector may be forecasted using one set of factors affecting the forecast and another vector may be forecasted using another set of factors affecting the second forecast. Different vectors may be forecasted at different times—e.g., one vector may change from T1 to T2 to T3 but another vector may only change from T1 to T3 and remain unchanged at T2.

Thus, the application produces one or more aged organisms. The organism that is aged to the time when the prediction of attack is needed is selected from output 616. Suppose the time at which the prediction is needed is Tn. Accordingly, the organism with vectors $U_t$, $V_t$, and $W_t$ at time Tn (labeled "n" in the upper right corner) is selected.

Figure 6C:
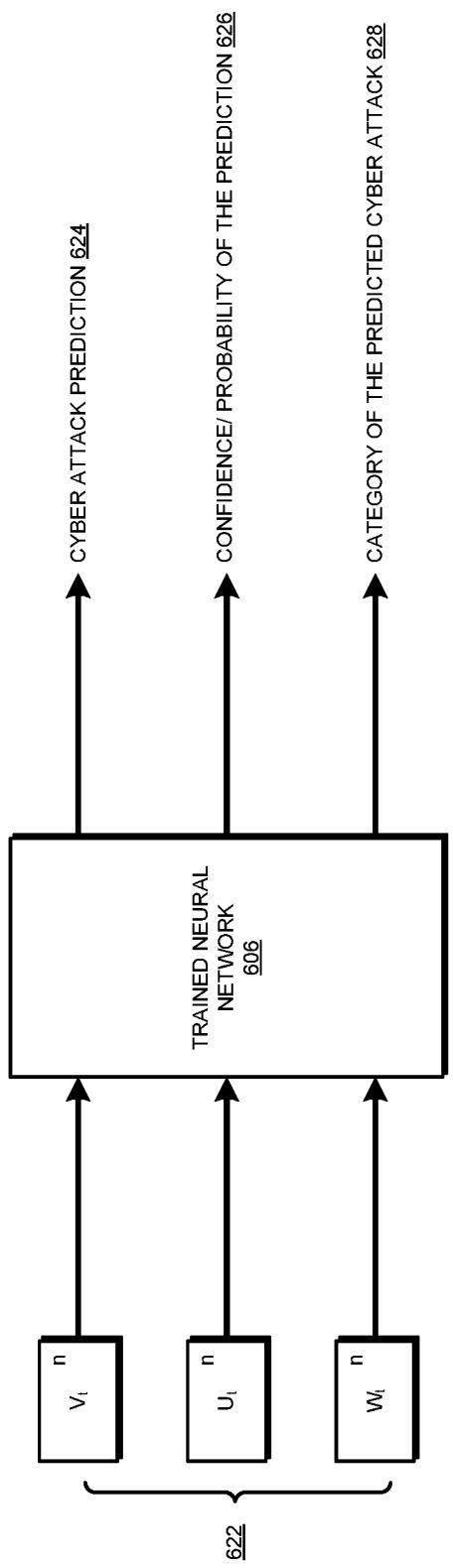
FIG. 6C depicts a block diagram of an example process of forecasting and classifying cyber attacks using analytical data based neural embeddings in accordance with an illustrative embodiment.

With reference to FIG. 6C, this figure depicts a block diagram of an example process of forecasting and classifying cyber attacks using analytical data based neural embeddings in accordance with an illustrative embodiment. Trained neural network 606 is the output of the process of FIG. 6A. Inputs 622 are vectors $U_t$, $V_t$, and $W_t$ at time Tn (labeled "in" in the upper right corner) are from the organism selected from output 616 in FIG. 6B. against, inputs 622 can be just the POL feature vector $U_t$ and Q&A feature vector $W_t$ at time Tn, just the analytical feature vector $V_t$ and Q&A feature vector $W_t$ at time Tn, or the POL feature vector $U_t$ with analytical feature vector $V_t$ and Q&A feature vector $W_t$ at time Tn, depending upon the embodiments used.

Trained neural network 606 uses inputs 622 to produce outputs 624, 626, and 628. Output 624 is the prediction of an occurrence of a cyber-attack at time Tn. Output 626 is the probability of, or the confidence in, the predicted occurrence of a cyber-attack at time Tn. Output 628 is the category of the predicted cyber-attack at time Tn.

Figure 7A:
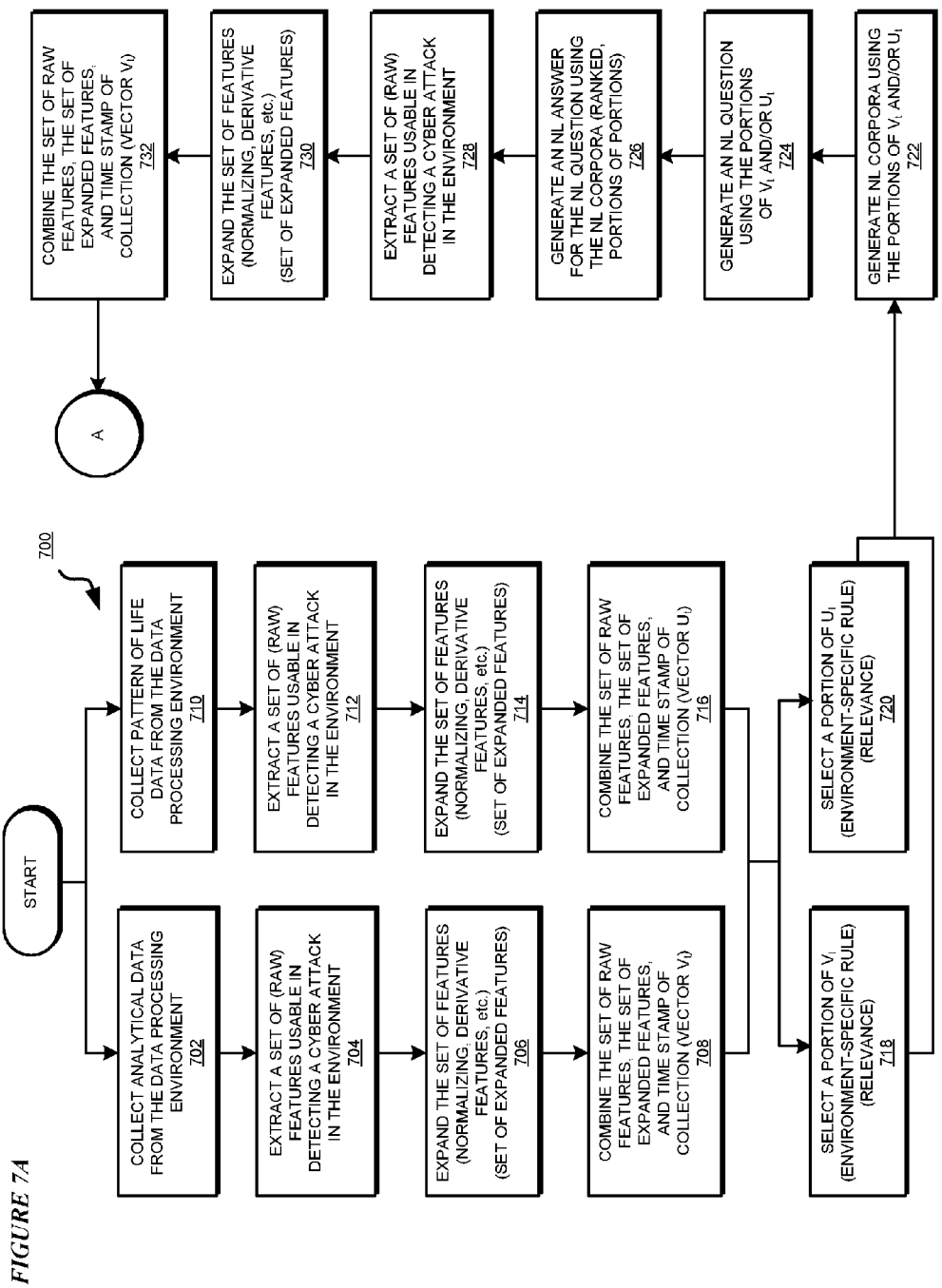
FIG. 7A depicts a flowchart of an example process for preparing the neural embeddings in accordance with an illustrative embodiment.

With reference to FIG. 7A, this figure depicts a flowchart of an example process for preparing the neural embeddings in accordance with an illustrative embodiment. Process 700 can be implemented in application 105 in FIG. 1.

When an embodiment is configured to use the analytical data of a data processing environment, the application collects the analytical data (block 702). The embodiment extracts a set of raw features that are usable in detecting a cyber-attack in the data processing environment (block 704). The application expands the set of features to form a set of expanded features (block 706). Some non-limiting examples of expansion methods include normalizing the raw features into expanded features, deriving expanded features from the raw features, or a combination of these and other techniques. The application combines the set of raw features extracted from the analytical data, the set of expanded features obtained based on the raw features extracted from the analytical data, and a timestamp of the collection of the analytical data, forming vector $V_t$ as described herein (block 708).

When an embodiment is configured to use the POL data of a data processing environment, the application collects the POL data (block 710). The embodiment extracts a set of raw features that are usable in detecting a cyber-attack in the data processing environment (block 712). The application expands the set of features to form a set of expanded features (block 714). Some non-limiting examples of expansion methods include normalizing the raw features into expanded features, deriving expanded features from the raw features, or a combination of these and other techniques. The application combines the set of raw features extracted from the POL data, the set of expanded features obtained based on the raw features extracted from the POL data, and a timestamp of the collection of the POL data, forming vector $U_t$ as described herein (block 716).

When an embodiment is configured to use the analytical data as well as the POL data of a data processing environment, the application performs blocks 702-708 as well as blocks 710-716.

When an embodiment is configured to use the analytical data, the application selects a portion of $V_t$ based on an NLP-suitability rule specific to the data processing environment (block 718). When an embodiment is configured to use the POL data, the application selects a portion of $U_t$ based on an NLP-suitability rule specific to the data processing environment (block 720). When an embodiment is configured to use the analytical data as well as the POL data of a data processing environment, the application performs block 718 as well as block 720.

The application generates an NL corpora using the portion of $V_t$, the portion of $U_t$, or both portions, as the case may be (block 722). The application generates a set of NL questions using the portion of $V_t$, the portion of $U_t$, or both portions, as the case may be (block 724).

The application generates an NL answer to an NL question using the NL corpora (block 726). The NL answer comprises ranked portions of the portions in the NL corpora that support the question, to wit, are usable for answering the question.

The embodiment extracts a set of raw features from an NL answer (block 730). The application expands the set of features to form a set of expanded features (block 732). The application combines the set of raw features extracted from the NL answers, the set of expanded features obtained based on the raw features extracted from the NL answers, and a timestamp of the collection of the analytical and/or POL data, forming vector $W_t$ as described herein (block 732).

Figure 7B:
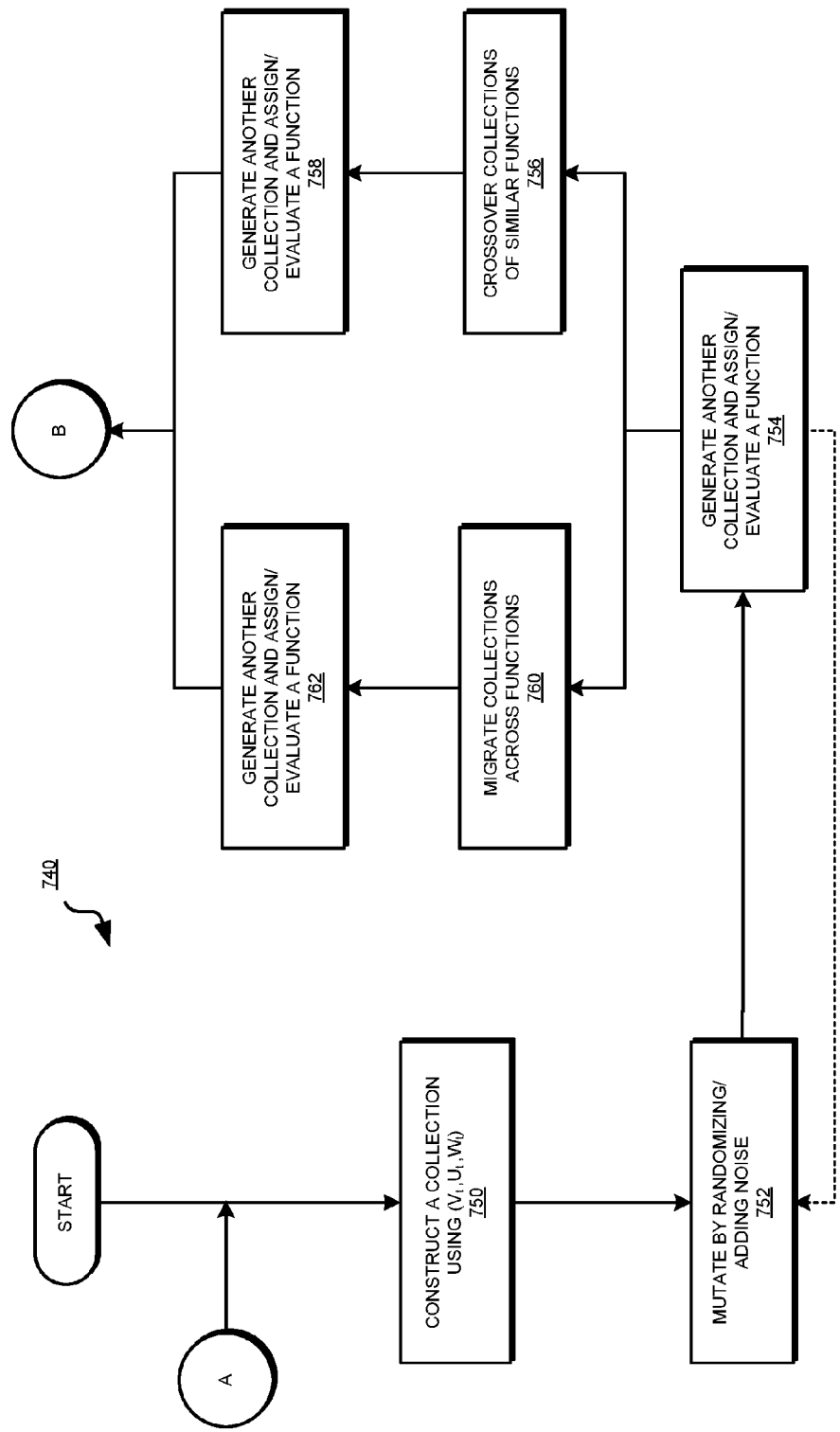
FIG. 7B depicts a flowchart of an example process for evolving a collection of neural embeddings in accordance with an illustrative embodiment.

The application either ends process 700 or exists process 700 at exit "A" to enter process 740 of FIG. 7B at entry "A" therein.

With reference to FIG. 7B, this figure depicts a flowchart of an example process for evolving a collection of neural embeddings in accordance with an illustrative embodiment. Process 740 can be implemented in application 105 in FIG. 1.

The application begins, or enters at entry "A", and constructs an initial collection using $V_t$ and/or $U_t$, and $W_t$, as were produced in process 700 of FIG. 7A (block 750). The application mutates the initial collection (block 752). The application thus generates additional one or more collections and assigns the created collection(s) a function based on the collection's evaluated characteristics, e.g., whether the collection exhibits better recall than precision, or recall exceeding a threshold, etc. (block 754).

When an embodiment is configured to use the crossover operation, the application crosses over collections of similar functions (block 756). The crossover operation generates additional one or more collections and assigns the created collection(s) a function based on the collection's evaluated characteristics (block 758).

When an embodiment is configured to use the migration operation, the application migrates collections of dissimilar functions (block 760). The migration operation generates additional one or more collections and assigns the created collection(s) a function based on the collection's evaluated characteristics (block 762).

When an embodiment is configured to use the analytical data as well as the POL data of a data processing environment, the application performs blocks 756-758 as well as blocks 760-762.

Figure 7C:
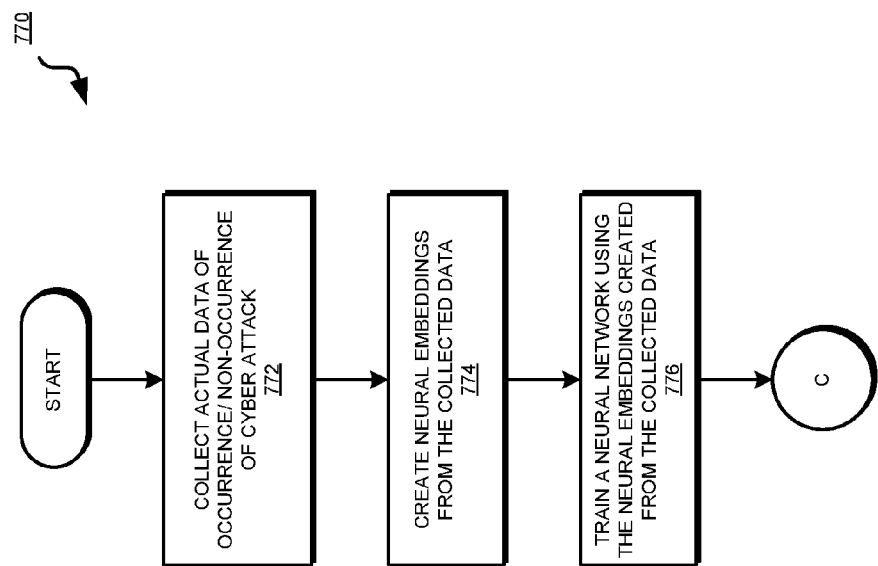
FIG. 7C depicts a flowchart of an example process for training a neural network in accordance with an illustrative embodiment.
Figure 7D:
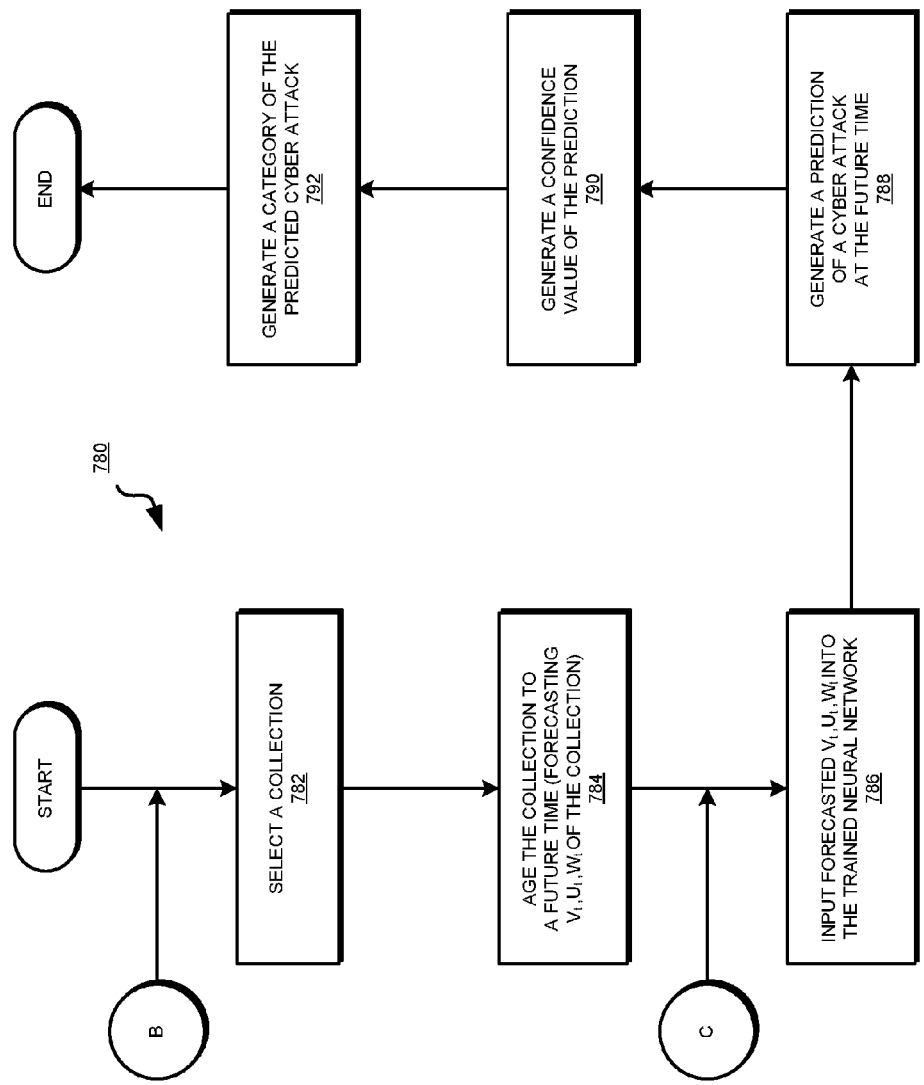
FIG. 7D depicts a flowchart of an example process for forecasting and classifying cyber attacks using analytical data based neural embeddings in accordance with an illustrative embodiment.

The application either ends process 740 or exists process 740 at exit "B" to enter process 780 of FIG. 7D at entry "B" therein.

With reference to FIG. 7C, this figure depicts a flowchart of an example process for training a neural network in accordance with an illustrative embodiment. Process 770 can be implemented in application 105 in FIG. 1.

The application collects actual analytical and/or POL data of an actual occurrence or non-occurrence of a known cyber-attack (block 772). The application creates neural embeddings from the collected data, such as by using a process similar to block 702-708 and/or blocks 710-716 in process 700, as the case may be. The application trains a neural network using the neural embeddings created from the collected data (block 776).

The application either ends process 770 or exists process 770 at exit "C" to enter process 780 of FIG. 7D at entry "C" therein.

With reference to FIG. 7D, this figure depicts a flowchart of an example process for forecasting and classifying cyber attacks using analytical data based neural embeddings in accordance with an illustrative embodiment. Process 780 can be implemented in application 105 in FIG. 1.

The application begins, or enters at entry "B", and selects a collection, such as a collection evolved through an evolution process described herein (block 782). The application ages the collection by applying a forecasting process to one or more neural embeddings of the collection (block 784).

The application receives the trained neural network from process 770 at entry point "C". The application inputs the forecasted set of neural embeddings of the aged collection into the trained neural network (block 786).

The application causes the trained neural network to generate a prediction of a cyber-attack at a future time—the time to which the collection has been aged (block 788). The application causes the trained neural network to generate a confidence level in the prediction (block 790). The application further causes the trained neural network to generate a classification of the predicted cyber-attack (block 792). The application ends process 780 thereafter.

Thus, a computer implemented method, system or apparatus, and computer program product are provided in the illustrative embodiments for forecasting and classifying cyber attacks using analytical data based neural embeddings. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   constructing a first collection, the first collection comprising an analytical feature vector and a Q&A feature vector;
   constructing a second collection from the first collection by inserting noise data in at least one of the analytical feature vector and the Q&A feature vector;
   further constructing a third collection by using at least one of (i) combining, to crossover, at least one of an analytical feature vector and a Q&A feature vector of the second collection with a corresponding at least one of an analytical feature vector and a Q&A feature vector of a fourth collection, wherein the second and the fourth collections have a property similar to one another, and (ii) combining, to migrate, at least one of an analytical feature vector and a Q&A feature vector of the second collection with a corresponding at least one of an analytical feature vector and a Q&A feature vector of a fifth collection, wherein the second and the fifth collections have a property distinct from one another;
   aging, using a forecasting configuration, an analytical feature vector of the third collection to generate a changed analytical feature vector, the changed analytical feature vector containing analytical feature values expected at a future time; and
   predicting, by inputting the changed analytical feature vector in a trained neural network, a probability of a cyber-attack occurring at the future time.

2. The method of claim 1, the combining to crossover further comprising:
   partitioning the analytical feature vector of the second collection into a first partition of a first size and second partition of a second size;
   partitioning the analytical feature vector of the fourth collection into a first partition of the first size and second partition of the second size; and
   constructing the analytical feature vector of the third collection by substituting the first partition in the analytical feature vector of the second collection with the first partition of the analytical feature vector of the fourth collection.

3. The method of claim 1, the combining to migrate further comprising:
   partitioning the analytical feature vector of the second collection into a first partition of a first size and second partition of a second size;
   partitioning the analytical feature vector of the fifth collection into a first partition of the first size and second partition of the second size; and
   constructing the analytical feature vector of the third collection by substituting the first partition in the analytical feature vector of the second collection with the first partition of the analytical feature vector of the fifth collection.

4. The method of claim 1, further comprising:
   further predicting, using the trained neural network, a classification of the cyber-attack occurring at the future time.

5. The method of claim 1, further comprising:
   aging using a second forecasting configuration, a Q&A feature vector of the third collection to generate a changed Q&A feature vector, the changed Q&A feature vector containing Q&A feature values expected at the future time, wherein the predicting also inputs the changed Q&A feature vector in the trained neural network.

6. The method of claim 1, further comprising:
   evaluating the property of the second collection, wherein the third collection has an increased value of the property.

7. The method of claim 1, wherein the noise is inserted by adding a random value to the analytical feature vector.

8. The method of claim 1, wherein the noise is inserted by changing an existing value in the analytical feature vector by a random amount.

9. The method of claim 1, wherein the noise is inserted by deleting an existing value from the analytical feature vector.

10. The method of claim 1, further comprising:
    extracting a set of Q&A features from the answer, a Q&A feature in the set of Q&A features being data with the characteristic;
    creating a set of expanded Q&A features from the set of Q&A features; and adding, to form the Q&A feature vector, the set of Q&A features, the set of expanded Q&A features, and a timestamp corresponding to a time of collection of the raw data.

11. The method of claim 1, wherein the method is embodied in a computer program product comprising one or more computer-readable storage devices and computer-readable program instructions which are stored on the one or more computer-readable tangible storage devices and executed by one or more processors.

12. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

13. The method of claim 1, further comprising:
constructing, from the first portion, NL corpora; and
submitting the NL question against the NL corpora using a Q&A system, wherein the Q&A system produces the answer corresponding to the NL question based on the NL corpora.

14. The method of claim 13, wherein the answer comprises a ranked list of sub-portions in the first portion, wherein a higher ranking sub-portion is more relevant in answering the NL question than a lower ranking sub-portion.

15. The method of claim 1, further comprising:
creating the analytical feature vector from raw analytical data present in a data processing environment;
identifying in the analytical feature vector, a first portion, wherein the first portion is suitable for natural language processing (NLP);
constructing, from the first portion, a natural language (NL) question, the NL question being related to a future cyber-attack on the data processing environment;
constructing the Q&A feature vector based on a set of features present in an answer to the NL question.

16. The method of claim 15, further comprising:
extracting a set of raw analytical features from the raw analytical data, a raw analytical feature in the set of raw analytical features being data with a characteristic, the characteristic being usable in detection of the cyber-attack; and
creating a set of expanded analytical features from the set of raw analytical features; and
adding, to form the analytical feature vector, the set of raw analytical features, the set of expanded analytical features, and a timestamp corresponding to a time of collection of the raw analytical data.

17. The method of claim 16, further comprising:
normalizing, as a part of creating the set of expanded analytical features, a raw analytical feature in the set of raw analytical features to form an extended analytical feature in the set of expanded analytical features.

18. The method of claim 16, further comprising:
deriving, as a part of creating the set of expanded analytical features, an expanded analytical feature in the set of expanded analytical features from a raw analytical feature in the set of raw analytical features.

19. A computer program product comprising one or more computer-readable storage devices, and program instructions stored on at least one of the one or more storage devices, the stored program instructions comprising:
program instructions to construct a first collection, the first collection comprising an analytical feature vector and a Q&A feature vector;
program instructions to construct a second collection from the first collection by inserting noise data in at least one of the analytical feature vector and the Q&A feature vector;
program instructions to further construct a third collection by using at least one of (i) combining, to crossover, at least one of an analytical feature vector and a Q&A feature vector of the second collection with a corresponding at least one of an analytical feature vector and a Q&A feature vector of a fourth collection, wherein the second and the fourth collections have a property similar to one another, and (ii) combining, to migrate, at least one of an analytical feature vector and a Q&A feature vector of the second collection with a corresponding at least one of an analytical feature vector and a Q&A feature vector of a fifth collection, wherein the second and the fifth collections have a property distinct from one another;
program instructions to age, using a forecasting configuration, an analytical feature vector of the third collection to generate a changed analytical feature vector, the changed analytical feature vector containing analytical feature values expected at a future time; and
program instructions to predict, by inputting the changed analytical feature vector in a trained neural network, a probability of a cyber-attack occurring at the future time.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to construct a first collection, the first collection comprising an analytical feature vector and a Q&A feature vector;
program instructions to construct a second collection from the first collection by inserting noise data in at least one of the analytical feature vector and the Q&A feature vector;
program instructions to further construct a third collection by using at least one of (i) combining, to crossover, at least one of an analytical feature vector and a Q&A feature vector of the second collection with a corresponding at least one of an analytical feature vector and a Q&A feature vector of a fourth collection, wherein the second and the fourth collections have a property similar to one another, and (ii) combining, to migrate, at least one of an analytical feature vector and a Q&A feature vector of the second collection with a corresponding at least one of an analytical feature vector and a Q&A feature vector of a fifth collection, wherein the second and the fifth collections have a property distinct from one another;
program instructions to age, using a forecasting configuration, an analytical feature vector of the third collection to generate a changed analytical feature vector, the changed analytical feature vector containing analytical feature values expected at a future time; and
program instructions to predict, by inputting the changed analytical feature vector in a trained neural network, a probability of a cyber-attack occurring at the future time.

* * * * *